(12) United States Patent
Park et al.

(10) Patent No.: US 8,388,863 B2
(45) Date of Patent: Mar. 5, 2013

(54) SILICATE PHOSPHOR FOR UV AND LONG-WAVELENGTH EXCITATION AND PREPARATION METHOD THEREOF

(75) Inventors: Joung Kyu Park, Daejeon (KR); Chang Hae Kim, Daejeon (KR); Kyoung Jae Choi, Chungcheongnam-do (KR); Kyung Nam Kim, Daejeon (KR); Jae Myung Kim, Chungcheongnam-do (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 531 days.

(21) Appl. No.: 12/067,425

(22) PCT Filed: Jun. 20, 2006

(86) PCT No.: PCT/KR2006/002359
§ 371 (c)(1),
(2), (4) Date: May 25, 2010

(87) PCT Pub. No.: WO2007/035026
PCT Pub. Date: Mar. 29, 2007

(65) Prior Publication Data
US 2010/0224830 A1 Sep. 9, 2010

(30) Foreign Application Priority Data
Sep. 22, 2005 (KR) .......... 10-2005-0088339

(51) Int. Cl.
C09K 11/54 (2006.01)
C09K 11/66 (2006.01)
(52) U.S. Cl. .............. 252/301.6 F; 252/301.4 F
(58) Field of Classification Search ........... 252/301.6 F, 252/301.4 R, 301.6 R, 301.4 F; 257/E33.061; 313/467, 468
See application file for complete search history.

(56) References Cited

U.S. PATENT DOCUMENTS

| | | | |
|---|---|---|---|
| 3,897,359 A | 7/1975 | Kobayashi et al. | |
| 3,984,587 A * | 10/1976 | Lipp | 427/70 |
| 6,093,346 A * | 7/2000 | Xiao et al. | 252/301.4 F |
| 6,884,367 B2 * | 4/2005 | Ono et al. | 252/301.4 F |
| 7,221,083 B2 * | 5/2007 | Oaku et al. | 313/485 |
| 2005/0168127 A1 * | 8/2005 | Shei et al. | 313/487 |
| 2006/0022208 A1 * | 2/2006 | Kim et al. | 257/98 |
| 2006/0043339 A1 * | 3/2006 | Tsukada | 252/301.4 R |

FOREIGN PATENT DOCUMENTS

| | | |
|---|---|---|
| EP | 1 367 655 A | 12/2003 |
| EP | 1367655 A1 * | 12/2003 |
| GB | 1 222 859 | 2/1971 |
| WO | WO 2004085570 A1 * | 10/2004 |

* cited by examiner

*Primary Examiner* — Emily Le
*Assistant Examiner* — Lynne Edmondson
(74) *Attorney, Agent, or Firm* — Frommer Lawrence & Haug LLP; Ronald R Santucci

(57) ABSTRACT

The present invention relates to a phosphor for UV and long-wavelength excitation and a preparation method thereof, more particularly to a phosphor for UV and long-wavelength excitation prepared from a phosphor precursor comprising strontium, barium, zinc, silica and rare-earth metal, wherein the proportion of barium and zinc is optimized to obtain a color coordinate in the range of x=0.50-0.64 and y=0.38-0.51, and a method for preparing the same by heat-treating the phosphor precursor under a mixed gas atmosphere of nitrogen and hydrogen with specific proportion. Since heat treatment is possible even at low temperature, a phosphor for UV and long-wavelength excitation having superior luminescence characteristics and thus offering superior efficiency when applied to diodes or liquid crystal displays can be obtained without having to use conventional flux materials to lower baking temperature and without using toxic substances.

3 Claims, 4 Drawing Sheets

SILICATE PHOSPHOR FOR UV AND LONG-WAVELENGTH EXCITATION AND PREPARATION METHOD THEREOF

This application is a 371 of PCT/KR2006/002359 filed on Jun. 20, 2006, published on Mar. 29, 2007 under publication number WO 2007/035026 A1 which claims priority benefits from South Korean Patent Application Number 10-2005-0088339 filed Sep. 22, 2005, the disclosure of which is hereby incorporated by reference.

TECHNICAL FIELD

The present invention relates to a phosphor for UV and long-wavelength excitation and a method of its preparation thereof. More particularly, the present invention relates to a phosphor for UV and long-wavelength excitation prepared from a phosphor precursor comprising strontium, barium, zinc, silica and rare-earth metal, wherein the proportion of barium and zinc is optimized to obtain a color coordinate in the range of x=0.50-0.64 and y=0.38-0.51, and a method for preparing the same by heat-treating the phosphor precursor under a mixed gas atmosphere of nitrogen and hydrogen with specific proportion. Since heat treatment is possible even at low temperature, a phosphor for UV and long-wavelength excitation having superior luminescence characteristics and thus offering superior efficiency when applied to diodes or liquid crystal displays can be obtained without having to use conventional flux materials to lower baking temperature and without using toxic substances.

BACKGROUND ART

At present, it is necessary to prepare different substrates such as InGaN, GaN, GaAs and ZnO substrates to prepare blue, green and red light emitting diodes. Because different semiconductor film should be used for each light emitting diode, the current preparation process requires high cost facilities. Therefore, if blue, red and green light emitting diodes can be prepared from the same semiconductor film, manufacturing cost and investment cost can be reduced remarkably. At present, white light emitting diodes, which are gaining spotlight as backlight source for liquid crystal displays of lightings, notebooks, cell phones, etc., are prepared by adding a yellow light (560 nm) emitting YAG:Ce phosphor to a blue light emitting diode. Because white light emitting diodes prepared from blue light emitting diodes are excited by light having a wavelength ranging from 450 to 470 nm, only a limited number of phosphors can be used. That is, only YAG:Ce-based white light emitting diodes can be obtained using blue light emitting diodes having a wavelength range of from 450 to 470 nm. Therefore, there is an urgent need for the development of new phosphors other than YAG:Ce.

As UV light emitting diodes are developed as excitation light source, a new era has opened in making white light emitting diodes with single chips. That is, by using each of red, green and blue phosphors with a chip having light with a wavelength ranging from 380 to 410 nm as energy source, it has become possible to obtain a tri-color white light emitting diode with better luminescence strength and offering superior white color. Consequently, a phosphor that can be excited in the wavelength range of from 380 to 410 nm is required. Especially, a new phosphor emitting light in the range of from yellow to red is needed to obtain white light with good efficiency and high color rendering index (CRI).

Disclosure

The present inventors worked ardently to develop a new yellow light emitting phosphor capable of overcoming the limitations of the conventional phosphors. As a result, they developed a $(Sr_{0.92}Ba_{0.03}Zn_{0.03})_3SiO_5:Eu_{0.07}$ phosphor, which offers superior luminescence characteristics and color purity while maintaining luminescence strength in the long wavelength region with a color coordinate of x=0.50-0.64 and y=0.38-0.51, from a phosphor precursor comprising strontium, barium, zinc, silica and rare-earth metal by optimizing the proportion of barium and zinc.

Also, the inventors of the present invention found that when the precursor mixture is heat-treated under a mixed gas atmosphere of nitrogen and hydrogen a phosphor can be prepared at low temperature without having to use conventional flux materials to lower baking temperature and without using toxic substances.

Thus, an object of the present invention is to provide a phosphor for UV and long-wavelength excitation offering orange-yellow color with a color coordinate of x=0.50-0.64 and y=0.38-0.51, having superior luminescence characteristics and color purity and offering very high luminous efficiency when applied to white light emitting diodes (LED) and active type liquid crystal displays (LCD) excited by long-wavelength UV and a preparation method thereof.

The present invention is characterized by a phosphor for UV and long-wavelength excitation having a color coordinate of x=0.50-0.64 and y=0.38-0.51, which is represented by the following formula (I):

$$(Sr_{1-x-y-z}A_xBa_nZn_y)_3SiO_5:Re_z \qquad (1)$$

where A is at least one alkaline earth metal selected from Ca and Mg, Re is a rare-earth metal, $0 \leq x \leq 0.5$, $0 < y \leq 0.5$, $0 < z < 0.2$ and $0 < n \leq 1$.

The present invention is also characterized by a method for preparing the phosphor for UV and long-wavelength excitation represented by the formula (1) comprising:

(a) stoichiometrically mixing a strontium precursor, a barium precursor, a zinc precursor and a silica precursor with a rare-earth metal precursor;

(b) drying the mixture at 100-150° C. to obtain a phosphor precursor; and (c) heat-treating the phosphor precursor under a mixed gas atmosphere of nitrogen and hydrogen with a volume proportion of 75-98 to 2-25 in the temperature range of from 800 to 1500° C.

The present invention relates to a novel phosphor for UV and long-wavelength excitation prepared from a phosphor precursor comprising strontium, barium, zinc, silica and rare-earth metal with a specific proportion of zinc and barium. The presence of barium and zinc offers a color coordinate of x=0.50-0.64 and y=0.38-0.51 and superior luminescence characteristics and color purity, while maintaining long wavelength luminescence strength. The components used in the present invention are conventionally used in a $(Sr_{1-x-y-z}A_xBa_nZn_y)_3SiO_5:Re_z$ (where A is at least one alkaline earth metal selected from Ca and Mg and Re is a rare-earth metal) phosphor. However, the phosphor of the present invention is totally different from conventional ones in that composition and content of the phosphor is optimized to attain superior color display and luminescence strength, etc. That is, when a phosphor is prepared from alkaline earth metal such as magnesium and calcium in accordance with the conventional methods, without using barium, photoluminescence shift from yellow to orange-yellow does not occur, and thus a color coordinate of x=0.50-0.64 and y=0.38-0.51 cannot be obtained with conventionally used composition and content.

The phosphor for UV and long-wavelength excitation according to the present invention is prepared as follows. A strontium precursor, an alkaline earth metal precursor, a barium precursor, a zinc precursor, a silica precursor and a rare-earth metal precursor are mixed in stoichiometric proportion. Each of the strontium precursor, alkaline earth metal precursor, barium precursor, zinc precursor, silica precursor and rare-earth metal precursor is one usually used in the related field. Specifically, it can be derived from oxide, carbonate, hydroxide, sulfate, fluoride, nitrate, selenide, arsenate or tungstate. Each of the precursor components may be comprised in stoichiometric proportion. The rare-earth metal precursor, or the active agent, may be selected from europium, cerium, praseodymium, samarium, gadolinium, dysprosium, holmium, erbium, thorium, ytterbium and lutetium. Preferably, europium is used for better activity, in the amount of 0.001 to 0.5 mol, preferably in the amount of 0.01 to 0.3 mol, per 1 mol of strontium. A content less than 0.001 mol is insufficient for function as an active agent. In contrast, a content exceeding 0.5 mol may cause deterioration in brightness due to concentration quenching.

The barium precursor is used in the amount of 0.001 to 1 mol, preferably in the amount of 0.1 to 0.7 mol, per 1 mol of strontium. If its content is less than 0.1 mol, it is impossible to attain the orange-yellow color coordinate. In contrast, if its content exceeds 0.7 mol it may result in unwanted solid solution of Ba and Si, e.g., $Ba_2SiO_4$, or secondary phase, thereby reducing luminous efficiency.

At least one alkaline earth metal precursor selected from magnesium and calcium may be mixed with the barium precursor. The alkaline earth metal precursor is used in the amount of 0.001 to 0.5 mol, preferably in the amount of 0.005 to 0.2 mol, per 1 mol of strontium. If its content is less than 0.005 mol it cannot confer the effect of addition. In contrast, if its content exceeds 0.2 mol it may result in decrease in luminous efficiency.

The zinc precursor is used in the amount of 0.001 to 0.5 mol, preferably in the amount of 0.005 to 0.2 mol, per 1 mol of strontium. If its content is less than 0.005 mol does not improve luminous efficiency. In contrast, if its content exceeds 0.2 mol it may result in decrease in luminous efficiency.

The mixing of the precursors may be performed by the methods commonly used in the related field and is not particularly limited. Preferably, however, a ball milling mixer or agate mortar may be used to obtain a thoroughly mixed mixture. Preferably, a small amount of solvent, such as distilled water, alcohol and acetone, may be added for more effective mixing.

Subsequently, the mixture is dried at 100 to 150° C. to obtain a phosphor precursor. If the drying temperature is below 100° C., it requires more time for drying. In contrast, if it exceeds 150° C., side reactions may occur. Preferably, the drying is carried out for 1 to 24 hours. The drying may be performed by the methods commonly used in the related fields and is not particularly limited.

Subsequently, the precursor is heat-treated under a mixed gas atmosphere of hydrogen and nitrogen to obtain a phosphor. In the conventional phosphor production processes, flux materials for lowering baking temperature and toxic substances had to be used during the heat treatment. However, in the present invention, heat treatment can be performed under a mixed gas atmosphere of hydrogen and nitrogen without using flux materials and toxic substances. The mixed gas is provided, so that the precursor reacts with the hydrogen gas to reduce the active agent and the crystal lattice is changed to attain wanted luminous efficiency. Preferably, the volume ratio of nitrogen and hydrogen in the mixed gas is preferably maintained at 75-98 to 2-25. In case excess nitrogen is used, the active agent is not fully reduced, making it difficult to obtain light of wanted color. In case excess hydrogen is used, the hydrogen gas may react with oxygen, leading to explosion.

During the heat treatment, temperature is maintained at 800 to 1500° C., preferably at 1000 to 1400° C. If the temperature is below 800° C., the phosphor crystal does not fully grow, resulting in reduced luminous efficiency. In contrast, if it exceeds 1500° C., brightness may be decreased because of excessive reaction.

The resultant phosphor powder has an orange-yellow photoluminescence (PL) spectrum with a main peak at around 570 to 590 nm when excited by a wavelength of 400 to 485 nm. And, it has a color coordinate of x=0.50-0.64 and y=0.38-0.51.

The phosphor for UV and long-wavelength excitation of the present invention has superior luminescence characteristics and color purity and luminescence strength is maintained in the long wavelength region, since the barium and zinc precursors shift the photoluminescence wavelength and enhance luminous efficiency. In accordance with the present invention, a phosphor having superior luminescence characteristics can be prepared by heat-treating under a mixed gas atmosphere of nitrogen and hydrogen, without using flux materials for lowering baking temperature and without using toxic substances. Because the phosphor of the present invention offers superior white light, it can be utilized for UV light emitting diodes and active type liquid crystal displays.

BEST MODE

Practical and preferred embodiments of the present invention are illustrated as shown in the following examples. However, it will be appreciated that those skilled in the art may, in consideration of this disclosure, make modifications and improvements within the spirit and scope of the present invention.

Example 1

Figure 1:
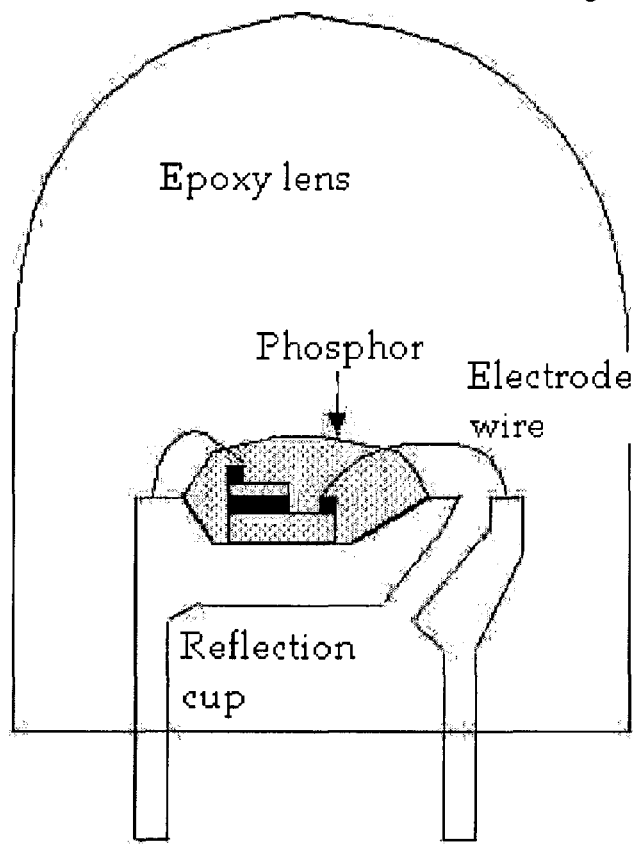
FIG. 1 illustrates a package type yellow light emitting diode.
Figure 2:
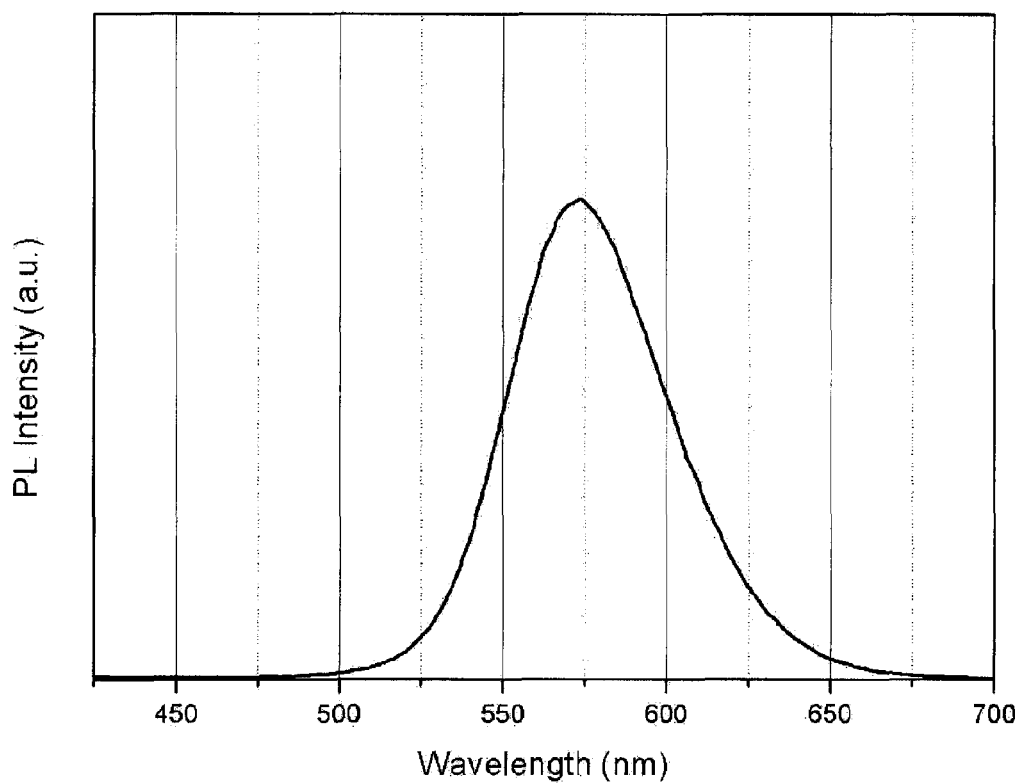
FIG. 2 shows the photoluminescence spectrum of the $(Sr_{0.92}Ba_{0.03}Zn_{0.03})_3SiO_5:Eu_{0.07}$ phosphor of the present invention prepared in Example 1, which was obtained by exciting the phosphor with 405 nm UV light.
Figure 3:
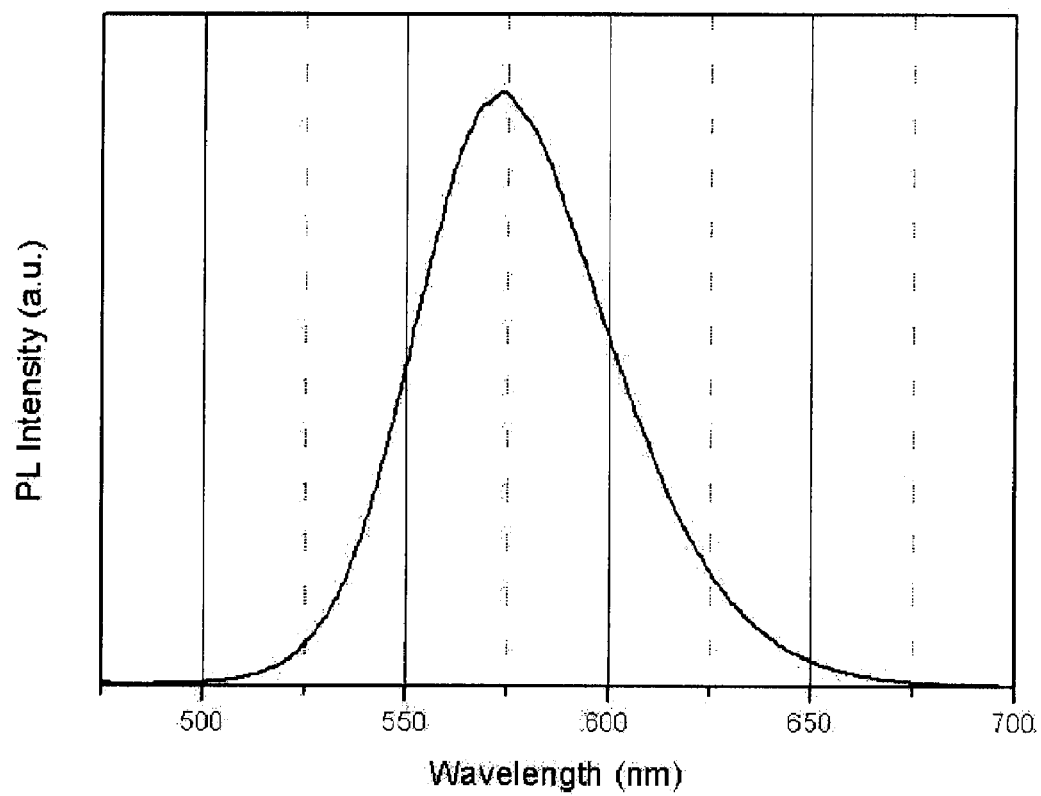
FIG. 3 shows the photoluminescence spectrum of the $(Sr_{0.92}Ba_{0.03}Zn_{0.03})_3SiO_5:Eu_{0.07}$ phosphor of the present invention prepared in Example 1, which was obtained by exciting the phosphor with 465 nm UV light.

Preparation of $(Sr_{0.92}Ba_{0.03}Zn_{0.03})_3SiO_5:Eu^{2+}_{0.07}$ Phosphor and Measurement of Photoluminescence Spectrum Strontium carbonate (2.76 mol), barium carbonate (0.09 mol), zinc oxide (0.09 mol), silica precursor (1 mol) and europium oxide (0.07 mol) were mixed stoichiometrically. For more effective mixing, mixing was performed by ball milling using 10 mL of acetone solvent. Subsequently, the mixture was put in an oven and dried at 120° C. for 24 hours. The dried mixture was put in a high-purity alumina boat and heat-treated at 1200° C. with an electric furnace for 24 hours under a mixed gas of hydrogen and nitrogen with a ratio of 20 to 80 by volume. The resultant phosphor for UV and long-wavelength excitation was excited to measure the photoluminescence spectrum, which is shown in FIG. 2 and FIG. 3. The color coordinate is given in Table 1.

TABLE 1

| | Phosphor | x | y |
|---|---|---|---|
| Example 1 | $(Sr_{0.92}Ba_{0.03}Zn_{0.03})_3SiO_5:Eu^{2+}_{0.07}$ | 0.513 | 0.502 |
| Example 2 | $(Sr_{0.88}Ba_{0.07}Zn_{0.03})_3SiO_5:Eu^{2+}_{0.07}$ | 0.521 | 0.493 |
| Example 3 | $(Sr_{0.85}Ba_{0.1}Zn_{0.03})_3SiO_5:Eu^{2+}_{0.07}$ | 0.523 | 0.489 |
| Example 4 | $(Sr_{0.817}Ba_{0.133}Zn_{0.03})_3SiO_5:Eu^{2+}_{0.07}$ | 0.551 | 0.459 |
| Comparative Example 1 | $(Sr_{0.95}Zn_{0.03})_3SiO_5:Eu^{2+}_{0.07}$ | 0.442 | 0.558 |
| Comparative Example 2 | $(Sr_{0.813}Ba_{0.167})_3SiO_5:Eu^{2+}_{0.07}$ | 0.550 | 0.458 |
| Comparative Example 3 | $Sr_{2.93}SiO_5:Eu^{2+}_{0.07}$ | 0.451 | 0.552 |

Examples 2-4

Phosphors for UV and long-wavelength excitation were prepared in the same manner as in Example 1, except for varying the contents of barium and zinc as given in Table 1. The color coordinates of the phosphors are given in Table 1.

From Table 1, it can be seen that the phosphors have color coordinates of x=0.50-0.64 and y=0.38-0.51, which give orange-yellow color.

Figure 4:
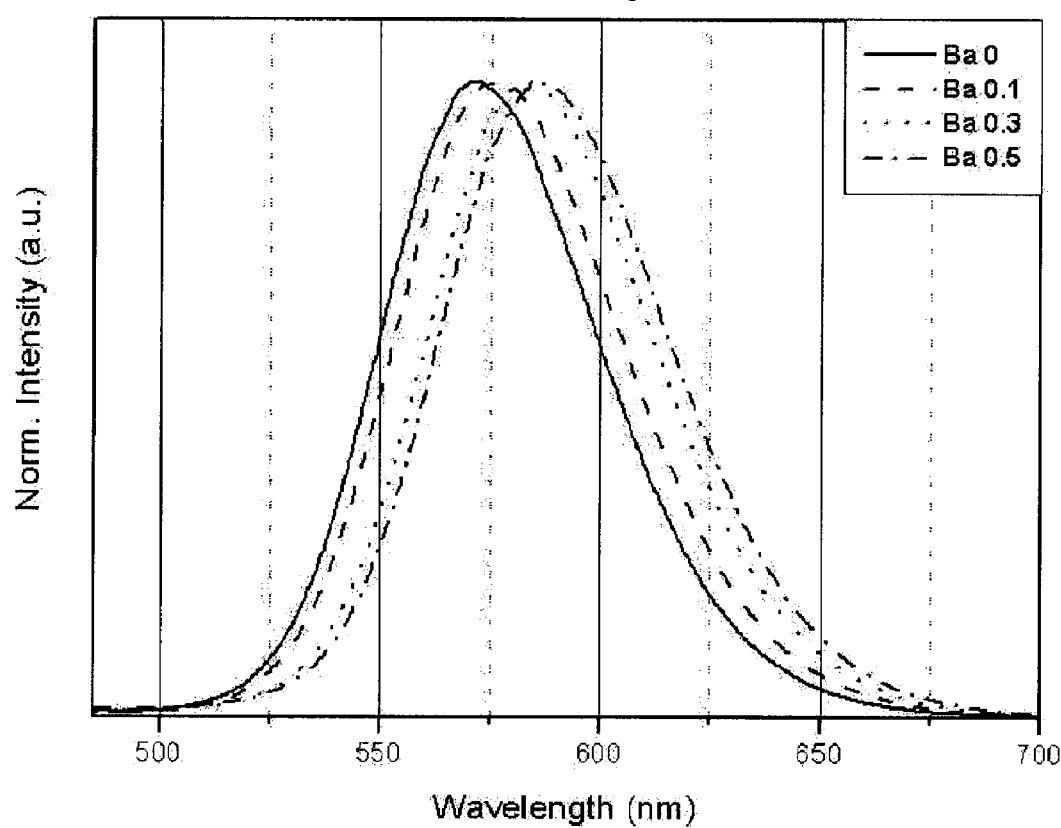
FIG. 4 shows the photoluminescence spectra of the phosphor of the present invention prepared by varying the barium content, which were obtained by exciting the phosphor with 465 nm UV light.

The phosphors of Examples 2-3 and Comparative Example 1 were prepared by varying the barium content. The photoluminescence spectrum measurement confirms that the photoluminescence intensity shifts to longer wavelength as the barium content increases (FIG. 4).

Figure 5:
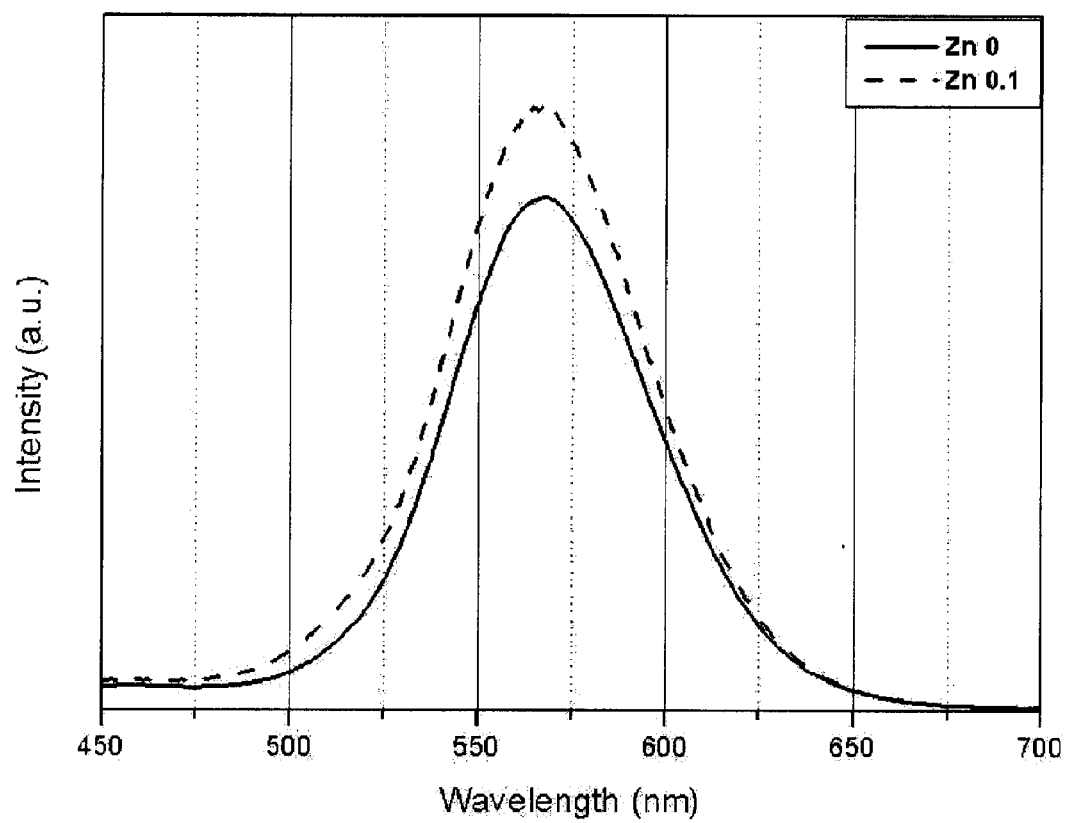
FIG. 5 shows the photoluminescence spectra of the phosphors of the present invention prepared in Examples 3 and 4, which were obtained by exciting the phosphors with 465 nm UV light.
Figure 6:
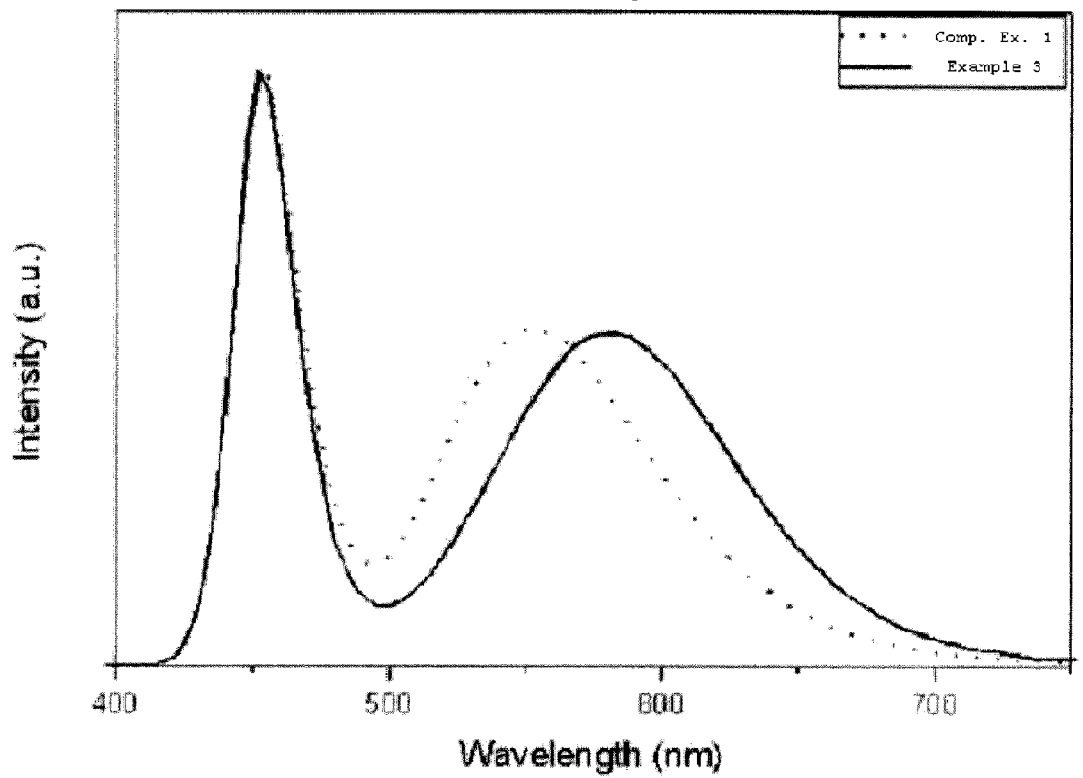
FIG. 6 compares the photoluminescence spectra of the white light emitting diodes prepared from the phosphors of Comparative Example 1 and Example 3.

The phosphors of Example 4 and Comparative Example 2 were prepared by varying the zinc content. As seen in FIG. 5, the addition of zinc resulted in about 120% of brightness improvement.

Example 5

Figure 7:
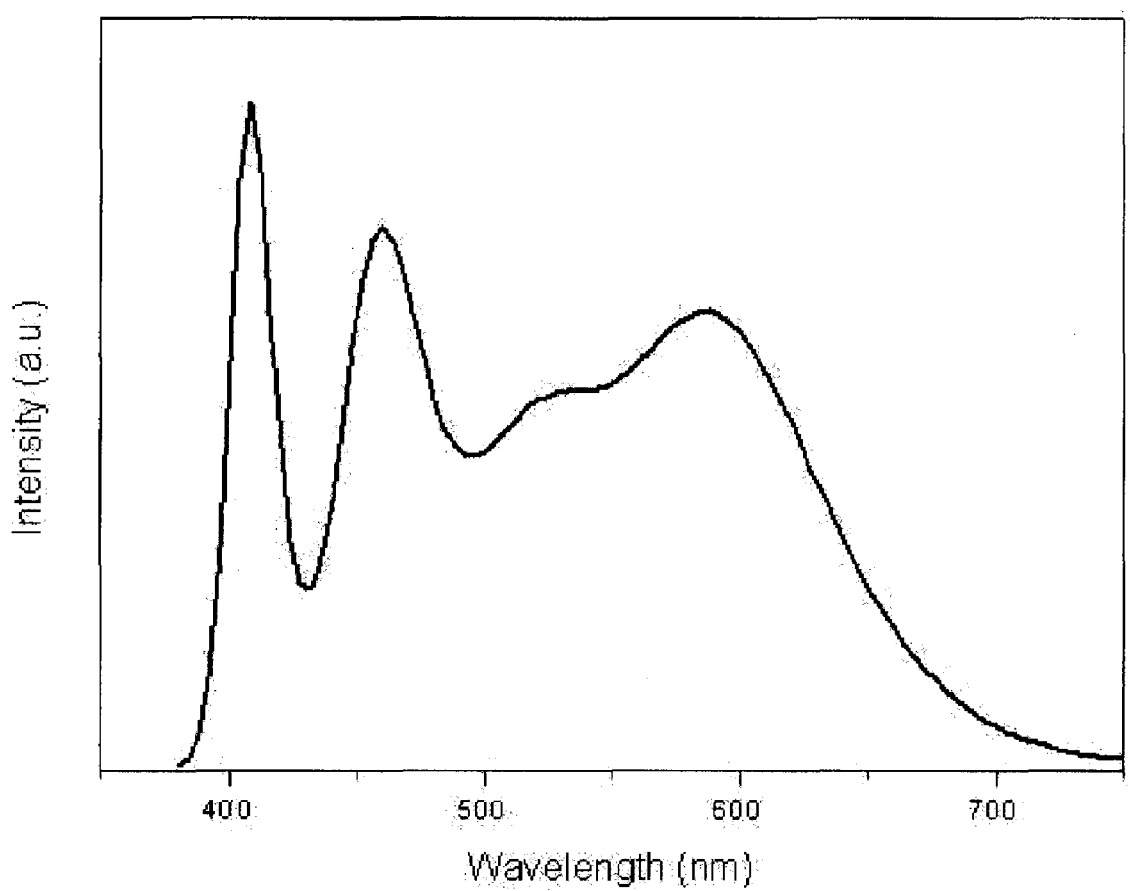
FIG. 7 shows the photoluminescence spectrum of the white light emitting diodes prepared from the phosphor of Example 5, a $Sr_2SiO_4:Eu$ phosphor and a $Sr_3MgSi_2O_8:Eu$ phosphor.

Preparation of White Light Emitting Diode Chip from $(Sr_{0.783}Ba_{0.167}Zn_{0.03})_3SiO_5:Eu^{2+}_{0.07}$ Phosphor and Blue and Green Phosphors The phosphor prepared in Example 1, a green phosphor ($Sr_2SiO_4:Eu$) and a blue phosphor ($Sr_3MgSi_2O_8:Eu$) were mixed at a proportion of 1:3:4 based on weight and a UV light emitting diode with an emitting wavelength of 405 nm was used to prepare a white light emitting diode. Photoluminescence spectrum is shown in FIG. 7 (color coordinate: x=0.331; y=0.337, white color, CRI=90).

Comparative Example 1

Photoluminescence Spectrum Measurement of $(Sr_{0.95}Zn_{0.03})_3SiO_5:Eu^{2+}_{0.07}$ Phosphor A phosphor was prepared in the same manner as in Example 1, without using barium. Photoluminescence spectrum measurement showed increase in brightness, no photoluminescence band shift, increase in luminous efficiency and a color coordinate of x=0.442 and y=0.558.

Comparative Example 2

Photoluminescence Spectrum Measurement of $(Sr_{0.813}Ba_{0.167})_3SiO_5:Eu^{2+}_{0.07}$ Phosphor A phosphor was prepared in the same manner as in Example 1, without using zinc. Photoluminescence spectrum measurement showed photoluminescence band shift to 585 nm and a color coordinate of x=0.550 and y=0.458.

Comparative Example 3

Preparation of White Light Emitting Diode Using $Sr_{2.93}SiO_5:Eu^{2+}_{0.07}$ Phosphor Photoluminescence spectrum measurement of the light emitting diode chip prepared from the $Sr_{2.93}SiO_5:Eu^{2+}_{0.07}$ phosphor showed a color coordinate of x=0.451 and y=0.552 and a very low CRI of 65.

To conclude, the light emitting diode chips prepared from the phosphor for UV and long-wavelength excitation of the present invention showed photoluminescence wavelengths of 570 to 590 nm and color coordinates of x=0.50-0.64 and y=0.38-0.51. With superior luminous efficiency, the phosphor of the present invention can compensate for the red color during the preparation of white light emitting diode, thereby ensuring high CRI and superior white color.

Industrial Applicability

As apparent from the above description, use of the phosphor for UV and long-wavelength excitation of the present invention enables selection of specific wavelength ranging from yellow to red and also enables selective use of light emitting diode for long wavelength or UV. In addition, with superior white color, the phosphor for UV and long-wavelength excitation of the present invention can be applied to UV light emitting diodes and active type liquid crystal displays as highly efficient yellow phosphor.

Those skilled in the art will appreciate that the concepts and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the present invention as set forth in the appended claims.

The invention claimed:

1. A method for preparing a phosphor for UV and long-wavelength excitation represented by the formula (1) below comprising:
   (a) stoichiometrically mixing a strontium precursor, a barium precursor, a zinc precursor, at least one alkaline earth metal precursor, and a silica precursor, as matrix components, and a rare-earth metal precursor, as an active agent component;
(b) drying the resultant mixture at 100-150° C. to prepare a phosphor precursor; and
(c) heat-treating the phosphor precursor at 800 to 1500° C. under a mixed gas atmosphere of nitrogen and hydrogen with a ratio of 75-98 to 2-25 by volume to prepare a phosphor for UV and long-wavelength excitation:

$$(Sr_{1-x-y-z}A_xBa_nZn_y)_3SiO_5:Re_z \qquad (1)$$

wherein A is at least one alkaline earth metal selected from Ca and Mg, Re is a rare-earth metal, $0.001 \leq x \leq 0.5$, $0.001 \leq y \leq 0.5$, $0 < z < 0.2$ and $0 < n < 1$.

2. The method for preparing a phosphor for UV and tong-wavelength excitation as set forth in claim 1, wherein each of the strontium precursor, alkaline earth metal precursor, barium precursor, zinc precursor, silica precursor, and rare-earth metal precursor is derived from oxide, carbonate, hydroxide, sulfate, fluoride, nitrate, acetate, selenide, arsenate or tungstate.

3. The method for preparing a phosphor for UV and long-wavelength excitation as set forth in claim 1, wherein the rare-earth metal is selected from europium, cerium praseodymium, samarium, gadolinium, dysprosium, holmium, erbium, thorium, ytterbium and lutetium.

* * * * *